Figure 1:
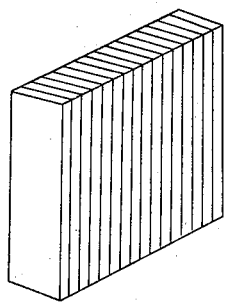

Nov. 23, 1937.   G. W. WALTON   2,100,044
TELEVISION
Filed March 16, 1932   5 Sheets-Sheet 1

Inventor
George W. Walton

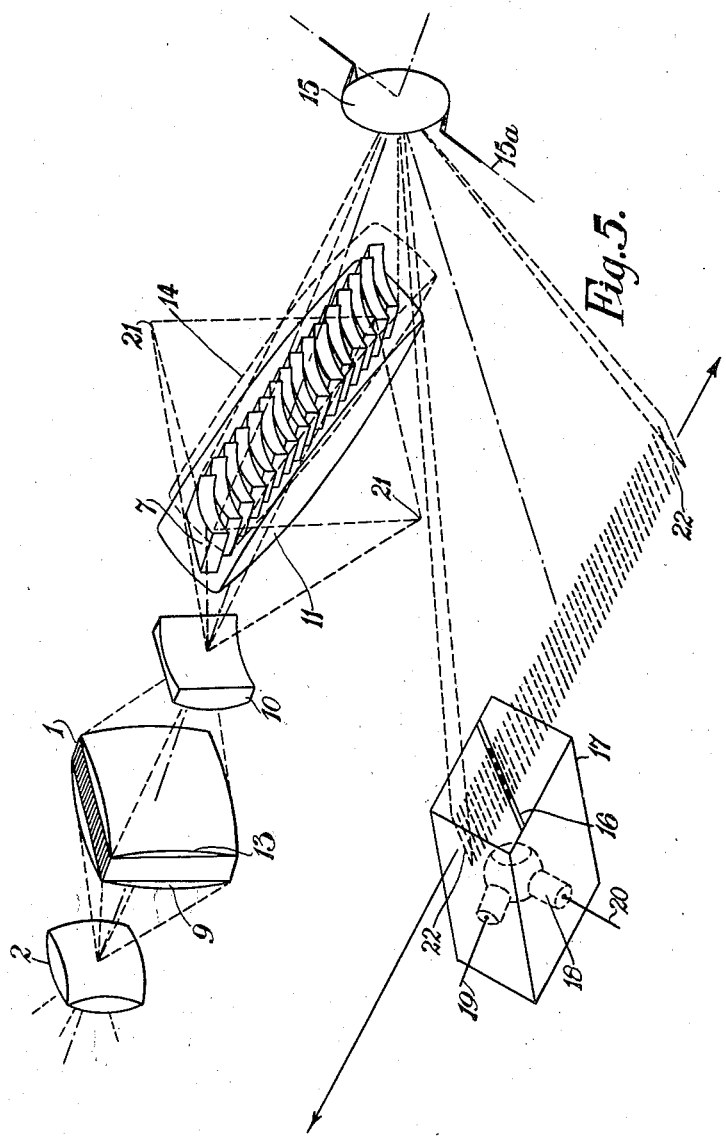

Nov. 23, 1937.  G. W. WALTON  2,100,044
TELEVISION
Filed March 16, 1932  5 Sheets-Sheet 3
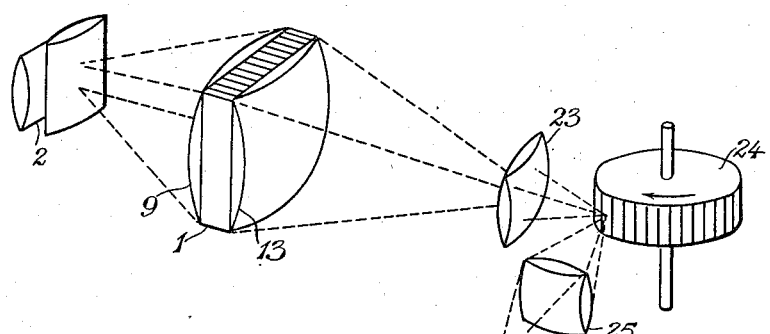
Fig. 6.
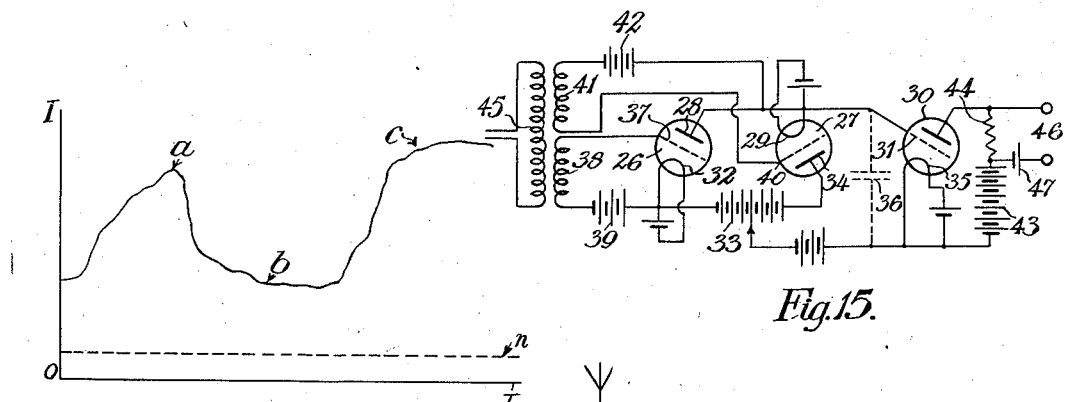
Fig. 15.
Fig. 16.
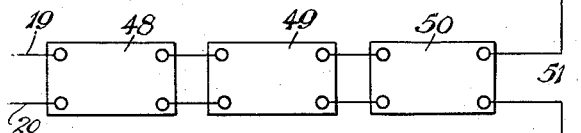
Fig. 17.
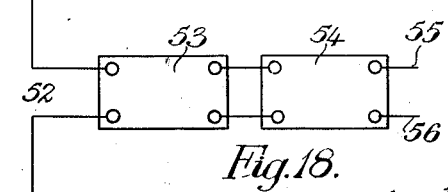
Fig. 18.

Nov. 23, 1937.　　　　　G. W. WALTON　　　　　2,100,044
TELEVISION
Filed March 16, 1932　　　5 Sheets—Sheet 4

Nov. 23, 1937. G. W. WALTON 2,100,044
TELEVISION
Filed March 16, 1932 5 Sheets-Sheet 5
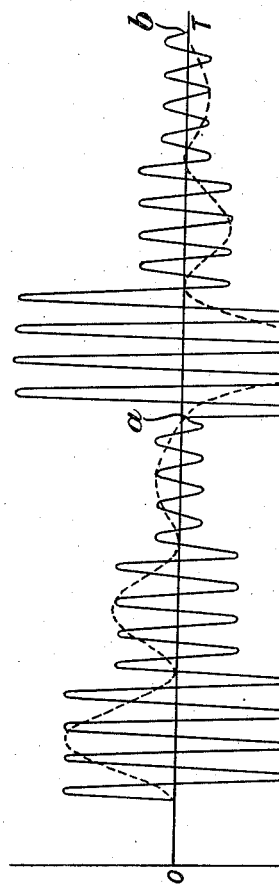
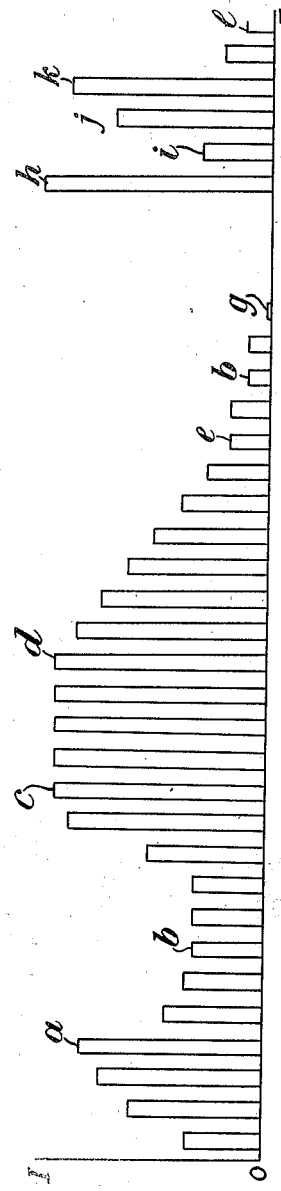
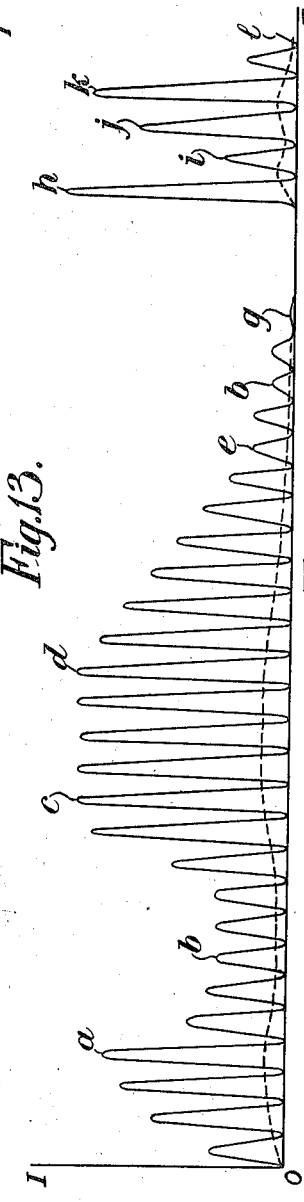

Patented Nov. 23, 1937

2,100,044

UNITED STATES PATENT OFFICE 2,100,044

TELEVISION

George William Walton, London, England

Application March 16, 1932, Serial No. 599,274
In Great Britain February 27, 1931

8 Claims. (Cl. 178—7.6)

The present invention relates to the electrical transmission of television and the like signals.

It is an object of the present invention to provide methods and means whereby such signals may be transmitted at substantially a single frequency, irrespective of whether this frequency is transmitted directly or is used to modulate a carrier oscillation.

In known television and picture transmission systems, when the object to be transmitted is scanned directly, current impulses corresponding to every change in brightness of the object are transmitted, although, for any given degree of definition, only a finite maximum number of changes in brightness require to be transmitted. The transmission, therefore, involves the transmission of an indefinite number of frequencies, any number of which can exist simultaneously, and the lowest frequency being equal to the number of complete pictures transmitted per second.

According to the present invention, there is provided a method of transmitting an image which comprises the step of deriving from said image an equivalent image in which the number of changes of density or brightness is reduced.

Thus, according to the present invention, the image to be transmitted may be resolved into a large number of elementary areas of equal extent, in at least one direction, or of extent varying in some determined way independent of the nature of the picture and arbitrarily fixed by the apparatus. The version of a picture produced by the apparatus at the transmitting end will be called the equivalent mosaic image. Within an elemental area, or mosaic element, of the image, the detailed distribution of intensity bears no relation to the detailed distribution in the corresponding area of the original picture, but the average intensity represents the average intensity of the corresponding picture element. The distribution within the element of the mosaic is arbitrarily fixed by the apparatus, and may be, for instance, uniform in the one direction and vary sinusoidally in the other. If such a mosaic image be appropriately scanned the signal will have a fundamental frequency arbitrarily imposed by the apparatus, and representing the number of mosaic elements scanned in unit time.

The image may be broken up into a mosaic image by any suitable optical device consisting of a large number of elementary parts, such as lenses, prisms or strips. A layer of small spherical lenses or lenses of other form may be employed, each lens casting an out-of-focus image of the corresponding element of the picture. The apparatus described in detail herein is a particular form in which the breaking up is performed by strips of glass, in a way that is designed for use with a device of the kind described in patent specification No. 328,286. The device in question serves to form, from an object, an image in which elemental areas of the object are deployed so that they do not overlap one another, viewed in a direction normal to the direction of deployment. Such an image will be referred to as a "stixograph".

Figure 3:
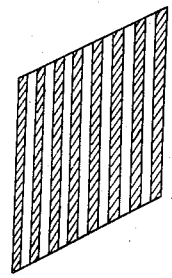
Figure 2:
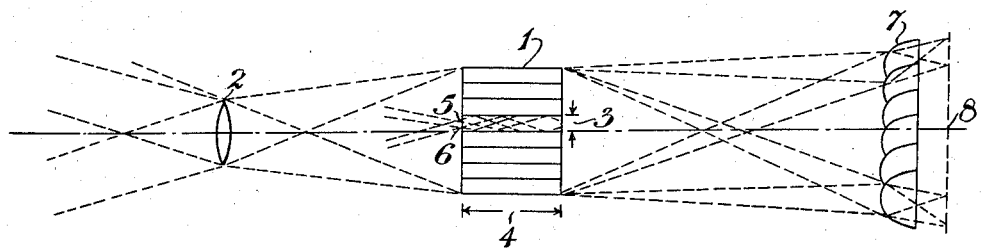
Figure 4:
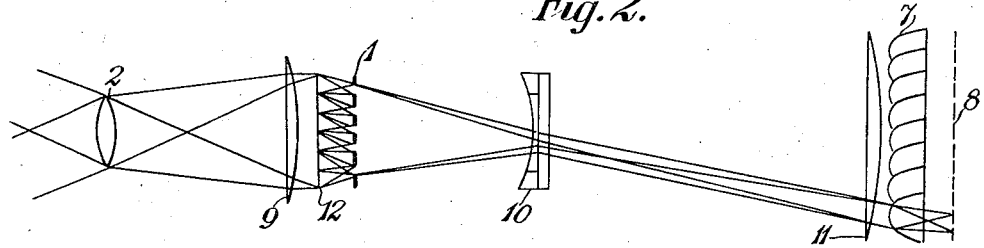
Figure 7:
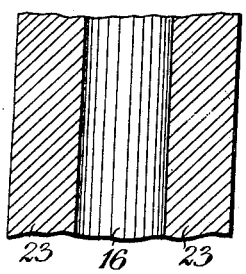
Figure 8:
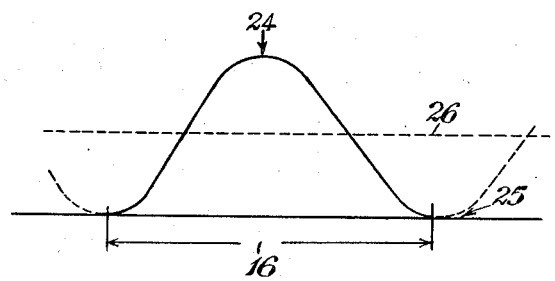
Figure 9:
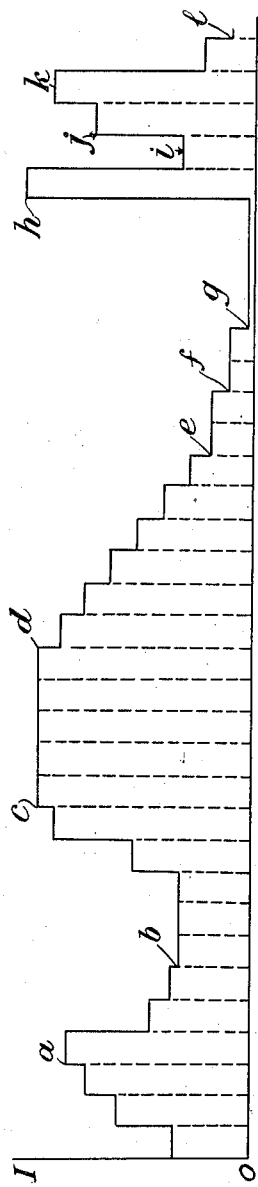
Figure 10:
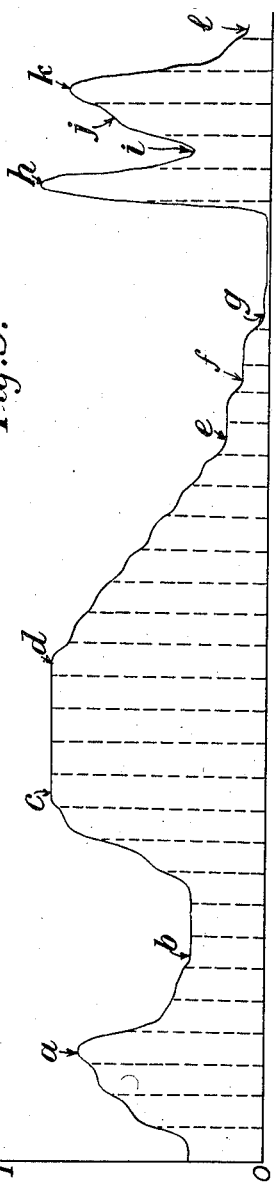
Figure 11:
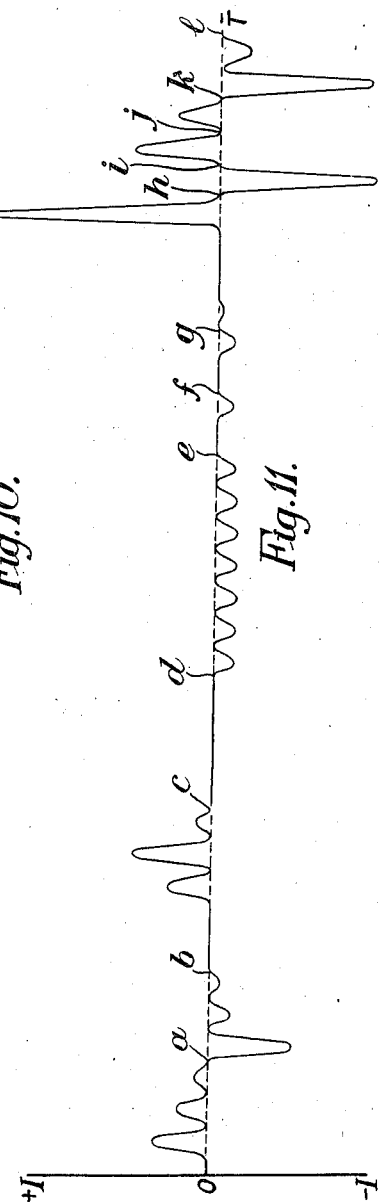

The invention will now be described making reference to the accompanying drawings, though it is to be understood that the invention is not to be regarded as in any way limited to the particular forms or arrangements shown in these drawings:

Fig. 1 shows a form of screen for the purpose of obtaining the equivalent of a mosaic picture, Fig. 2 shows the device of Fig. 1 included in an optical system for the purpose of producing a one-dimensional image or stixograph of a picture which is equivalent to a mosaic picture, Fig. 3 shows an alternative form of screen, Fig. 4 shows the inclusion of the screen of Fig. 3 in an arrangement similar to that shown in Fig. 2, Fig. 5 shows the use of the screen of Fig. 1 in a television apparatus using one-dimensional scanning, Fig. 6 shows the use of the screen of Fig. 1 in an arrangement using two-dimensional scanning, Fig. 7 shows a form of aperture for use in scanning a picture having differences of light intensity such as are produced in the arrangement of Fig. 5, Fig. 8 shows a graph of the transparency across the aperture of Fig. 7 in the direction of scanning, Fig. 9 shows graphically the light intensities of successive elements of a mosaic picture, as produced by the device of Fig. 1 when scanning, as in television, Fig. 10 shows the current of a photoelectric cell obtained by scanning a picture as shown in Fig. 8 by the aperture shown in Fig. 7, Fig. 11 shows the form of current produced in the secondary of a transformer or through a condenser by the photoelectric current as shown in Fig. 9, Fig. 12 shows graphically the form of a side frequency produced by the current of a photoelectric cell as shown in Fig. 10, Fig. 13 shows graphically the light intensities of successive elements of a mosaic picture as formed by the device of Fig. 3, Fig. 14 shows the varying photo-electric current obtained by scanning a picture of the type shown in Fig. 13 by the aperture of Fig. 7, Fig. 15 shows a form of device which may be used for the purpose of reconverting a current as shown in Fig. 12 into a current as shown in Fig. 10, Fig. 16 shows the output current of the device of Fig. 15, Fig. 17 shows diagrammatically an arrangement of a wireless transmitter operated by currents of the form shown in Fig. 10 for the purpose of transmitting isolated waves of the type shown in Fig. 13, Fig. 18 shows diagrammatically an arrangement of a receiver for the purpose of receiving signals from a transmitter according to the invention and reconstructing a replica of the photo-electric cell current of the transmitter for the purpose of reproducing a picture of a scene at the transmitter.

For the purposes of television according to this invention, there may be employed a device which will divide the picture into a number of parallel strips of approximately equal width, so disposed relative to the scanning arrangement that the direction of scanning is at right-angles to the length of the strips. Fig. 1 shows such a device, which is composed of a number of plates of transparent material such as glass, of approximately equal thickness, which for the purpose of manufacture are cemented together in a pile for the purpose of grinding and polishing the edges of the plates, so that the block shall be approximately a parallelopiped. After manufacture the cement is dissolved out from between the plates and, without disturbing the arrangement of the plates, they are mounted in a suitable holder so that the plates are not in optical contact.

Fig. 2 shows the use of the device of Fig. 1 in connection with an optical system for forming a one-dimensional image such as described in the specifications of patent applications Serial Nos. 400,883 and 426,344, which will be referred to as a stixograph. 1 is the device of Fig. 1, hereinafter referred to as an integrating screen, 2 is an object lens, which forms a real image of some scene or picture, hereinafter referred to as the object, on the nearest surface of the integrating screen. As the plates of 1 are not in optical contact, rays of light entering one plate will be confined to that plate, because of internal reflection, and also all light entering one such plate will by multiple reflection be integrated. For this purpose it is necessary to arrange that the length 4 of the plate shall be great relative to its thickness 3, in order that there shall be several complete reflections for each ray of light. For instance, suppose the two points 5 and 6 of the image formed by 2 are focussed on to one plate. From the point of entry the pencils of light diverge, but the internal reflection restricts the divergence up to the point of exit, so that at the point of exit the light of the two points 5 and 6 is integrated. Similarly the light of all points of the image incident on one plate and in a line at right angles to the plane of the plate will be integrated. At the emergent surface of the device 1, each plate will have a uniform colour and light intensity or brightness across the thickness of each plate and the brightness will be substantially equal to the average brightness of the corresponding area on the object. The echelon device 7 will view the emergent surface of the device 1, each lamination of 7 forming an individual reduced image of the emergent surface of 1, consequently the image 8 will be a stixograph image consisting of details, each of which is of approximately equal size in the dimension in which the image is defined, and the colour and light intensity or brightness across each detail will be uniform in that dimension.

Fig. 3 shows an alternative form of screen consisting of a number of parallel black lines between which are transparent lines. Fig. 4 illustrates the use of the device of Fig. 3, an object lens 2 forming a real image at 12 through a collimating lens 9. The screen 1 of the type shown in Fig. 3 is placed at a suitable distance from the image 12, each lamination of the echelon device 7 viewing the screen 1 through lenses 11 and 10, so that the image at 8 is a stixograph consisting of black lines, alternating with light lines of varying intensity, according to the object, the whole of these lines being of approximately equal size in that dimension in which 8 is defined, and the colour and light intensity of each of the light lines being uniform across its width.

Fig. 5 shows a complete optical arrangement of a television transmitter using stixograph images. The integrating screen 1, of the kind shown in Fig. 1, is placed between the components 9 and 13 of a condenser, the object lens 2 forming a real two dimensional image on the front surface of 1. The lens 10 has its front surface convex cylindrical on a horizontal axis, and the other surface concave cylindrical on a vertical axis, so that it acts as two independent lenses, the front surface forming, on the entrant surfaces of the echelon device 7, a horizontal cylindrical real image of the image on the front surface of 1. The second surface of the lens 10 forms a virtual vertical cylindrical image of the faces of the integrating screen 1, this virtual image being viewed by each lamination of the device 7, so that the latter forms a virtual stixograph image.

A collimating lens 11 is placed before the echelon device 7 and a condenser lens 14 (shown dotted for clearness) after 7 for the purpose of concentrating all the light of the stixograph image formed by 7 on to the oscillating mirror 15. The mirror 15 oscillates about an axis 15a at right angles to the inclination of the stixograph image, this axis passing through the centre of the mirror but being inclined with respect to the mirror surface. Since the mirror 15 is a convex lens mirror, it forms a stixograph real image 22 of the virtual image formed by 7. The image 22 is focussed in the plane of a slit 16 of a chamber 17 containing a photo-electric cell 18. As the mirror 15 oscillates, the image 22 is caused to move backwards and forwards across the slit 16, so that light from each detail of 22 successively actuates the photo-electric cell 18, thereby producing variations of electric current in a circuit containing a source of potential connected to the leads 19 and 20 of the photo-electric cell 18. The mirror 15 may co-operate with any number of fixed lenses to form the image 22.

Fig. 6 shows an optical arrangement using two dimensional scanning. An object lens 2, consisting of two cylindrical components with their axes at right angles, forms a vertical cylindrical real image on the front surface of the integrating screen 1, and a horizontal cylindrical real image on the exit surface of the integrating screen 1. Light from the image at the exit surface of 1 passes through the lens 23 and is reflected by the operative mirror of a rotating mirror drum 24 of known type through lens 25 on to the aperture 16 of the chamber 17, containing the photo-electric cell 18. By means of the lenses 23 and 24 there is formed, at the aperture 16, an image of the image at the exit surface of 1, and the image formed by lenses 23 and 24 is, due to the motion of the mirror drum 24, caused to move over the aperture 16, thereby causing light from the elements of the mosaic in one line of the image to actuate successively the photo electric cell 18. When the next mirror of the drum 24 comes into operation an image is swept over the aperture 16 at a different vertical level and another line is scanned; and so on until the whole of the object has been scanned.

Many other optical arrangements similar to Figs. 5 and 6 and using the integrating screen of Fig. 1 or a screen of the type shown in Fig. 3 may be used and are all within the scope of this invention.

The slit 16 in Fig. 5 and aperture 16 in Fig. 6 for the purpose of this invention should preferably be of a particular form which is shown in Fig. 7. Across the width of the slit or aperture between the opaque portions 23 and in the direction in which scanning is accomplished, the transparency varies preferably as shown in Fig. 8. In Fig. 8 the line 25 represents zero transparency, i. e. full black, the distance 16 representing the width of the aperture or slit in the direction of scanning. This width should preferably be approximately equal to the average thickness of the laminations of the integrating device 1. The solid line curve rises from zero to a maximum transparency at 24, i. e. full white, and decreases again to zero. The curve of variation of transparency is a versed sine curve (i. e. $1-\cos\theta$) and is obviously of a sinusoidal type, as is shown by the dotted curve together with the full line curve, where 26 would be the zero line if it was a sine curve. The variation of transparency is very readily accomplished by photographic means, where the silver deposit at the edges of the aperture is heavy, and light at the centre of the aperture.

Fig. 9 shows a curve of the light intensities such as would be obtained from the successive details of an object at the slit in Fig. 5 or the aperture 16 in Fig. 6.

Fig. 10 shows a curve of the variations of electric current through a photo-electric cell (18 in Figs. 5 and 6) such as would be obtained from a picture as shown in Fig. 9 when scanned through an aperture of the type shown in Figs. 7 and 8. It will be noted that the instantaneous changes of light intensity produce as shown in Fig. 10 changes in electric current which follow smooth curves, whereas with an ungraded aperture the current changes are much more sudden. The time period of each current pulse representing a change of light intensity will be equal to the time required for a point of the mosaic equivalent of the object to traverse the full width of the aperture during scanning. If the speed of scanning is uniform, then the time period of all the changes of current in Fig. 10 will be equal, and the rates of change of each change of current will be in accordance with the same trigonometrical function, which is decided by the change of transparency across the scanning aperture, though the maximum rate of change of each variation of electric current in Fig. 10 will depend upon the total change of light intensity in Fig. 9.

If the circuit of the photo-electric cell 18 in Fig. 6 in which flows the current of Fig. 10, is coupled at terminals 19' to 20' to a second circuit through a condenser $C_1$ or through a transformer, an electric current as shown in Fig. 11 will be produced in the second circuit. For convenience, corresponding points on the three curves in Figs. 9, 10 and 11 are given the same identification letter. In Fig. 11 it will be noted that a period of constant current corresponding to a period of constant light intensity, such as from $c$ to $d$, shows no current, and therefore the constant periods are eliminated. Each change of light intensity in Fig. 9, and therefore of current in Fig. 10 produces one impulse in Fig. 11. Each of these impulses varies in intensity according to the versed sine law, (i. e. varies similarly to the change of transparency of the aperture as shown in Fig. 8). Every increase of electric current in Fig. 10 produces in Fig. 11 an impulse of one phase, and every decrease of current in Fig. 10 produces in Fig. 11 an impulse of a phase 180 degrees displaced from the increases, so that in Fig. 11 increases are shown positive, and decreases are shown negative, as they would appear in actual practice. It will be noted that each change of light intensity in Fig. 9 produces one complete cycle in Fig. 11, and the time period is the same for all the cycles in Fig. 11 when the scanning speed is uniform. A series of successive increases, for instance from $o$ to $a$, will appear as an equal number of complete cycles of an alternating current and a series of successive decreases, such as $d$ to $e$, will appear also as an equal number of complete cycles of alternating current, of the same frequency as in the case of $o$ to $a$, but 180 degrees phase displaced. If an increase is immediately followed by a decrease or vice versa, as shown by $h$ to $j$, two complete cycles of opposite phase will be produced. A constant period followed by one change of intensity, and then by a further constant period will produce only one complete cycle as shown by $e$ to $f$.

It should be noted that the correct phase relation between pulses is maintained even when an interval of steady or zero current intervenes.

It will be appreciated that the current shown in Fig. 11 is completely representative of the current shown in Fig. 10, provided some method of inserting constant periods can be found. Such a method will be described later.

The time period of one cycle of current change in Fig. 9 is readily ascertained from the number of details in the object, and the number of times the object is scanned per second. For instance, suppose that the object is divided into 100 strips, that each strip contains 150 square details (such as will be formed if in Fig. 5 the echelon 7 has 100 laminations and the integrating screen 1 consists of 150 plates), and that the number of times the object is scanned per second is 20 (i. e. that the oscillating mirror in Fig. 5 has a frequency of oscillation of 10 per second), then there will be a possible maximum of 300,000 changes of light intensity per second, and each change of light intensity will take place in 1/300,000 of a second, provided the width of the scanning slit 16 in Fig. 5 is equal to the thickness of one plate of the integrating screen 1 when projected into the plane of the slit. In such a case a series of consecutive decreases, such as $d$ to $e$ in Fig. 11 will produce an alternating current having a frequency of 300,000 per second. This frequency is of course comparable with those used in wireless communication and corresponds to a wave length of one thousand metres, so that the impulses shown in Fig. 9 may be transmitted directly by wireless without the necessity of modulating a carrier oscillation with them. The transmission may be accomplished by energizing the transmitting antenna system with the current shown in Fig. 10 for ether waves would only be produced during periods of change of current intensity, and therefore Fig. 11 would represent the actual ether waves transmitted. In some cases isolated whole waves will be transmitted, for instance, the two isolated waves between e and g. In other cases, such as d to e, a train of waves will be transmitted. The amplitude of an individual wave will depend upon the maximum change of light intensity in Fig. 9, and obviously there will be nothing transmitted during periods of constant light intensity.

It will be realized that each individual impulse or train of impulses will have a definite wave length, namely in the instance given 1000 metres, and therefore the antenna of a receiving station can be tuned to them for the purpose of obtaining selectivity. The advantages of such transmissions are that normal wireless receiving apparatus will not be affected by them for such signals will be incapable of setting up oscillations in a tuned circuit due to the fact that waves such as from o to a in Fig. 11 tend to set up an oscillation of one phase, and other waves such as a to b tend to set up oscillations of the opposite phase, with the result that they nullify each other. In a normal picture it can be anticipated that there will be as many increases of light intensity as there are decreases, and therefore there will be as many positive waves as negative waves, particularly if oscillatory scanning such as shown in Fig. 5 is used. Again, the average increase of light intensity will be equal to the average decrease of light intensity, and therefore during a transmission the total energy in positive waves will equal the total energy in negative waves, and positive waves will be as frequent as negative waves, so that in a normal oscillatory circuit tuned to the frequency of the incoming waves, oscillations will not have sufficient time to build up to any appreciable value in one phase before an oscillation of the opposite phase commences to build up, and therefore the effect on such an oscillatory circuit can be considered as zero.

In the case of a circuit not tuned to the incoming waves, there will be little tendency to shock excitation by trains of waves or isolated waves, because of the opposite polarities possible in the waves, apart from the fact that the waves have an entirely different frequency. Provided the speed of scanning is uniform, the transmission of signals representing a picture will be accomplished by what is theoretically a single frequency, though in actual practice transmission may be by means of a very narrow band of frequencies due to the varying amplitudes of the waves, which band will be very considerably less than is necessary in the case of telephonic transmission.

If the speed of scanning is not uniform the transmission frequency will vary with it. In some cases this is desirable, for instance, if the speed of scanning is sinusoidally varied the transmission will be frequency modulated. In Fig. 5, if 15 oscillates at 10 per second with a sinusoidal variation of scanning speed the frequency modulation will be at 10 per second and may be used to synchronize the mirror of a receiver with that of a transmitter as described in the specification of patent application Serial No. 572,138.

An alternative method of transmitting signals representing the current of Fig. 10 consists of modulating a carrier oscillation with the current of Fig. 10, or the current of Fig. 11, as in wireless telephony. Such a modulation will produce only one pair of side frequencies, which due to the high frequency of the rates of change of current in Figs. 10 and 11 (i. e. 300,000 per second in the example previously given) will be very widely separated from the carrier frequency as well as from each other, so that one side frequency and one carrier frequency may be readily suppressed by ordinary tuned oscillatory circuits, thereby leaving one side frequency only for the purposes of transmission. The appearance of such a side frequency is shown in the curve of Fig. 12, which corresponds to the portion o to b of Figs. 10 and 11. In Fig. 12 the portion o to b of Fig. 11 is indicated in the dotted line for comparison. It should be noted that the portion o to a consists of oscillations of one phase and a portion a to b consists of oscillations of the opposite phase, i. e. just as the impulses a to b in Fig. 11 are opposite to the impulses o to a. The amplitude of the oscillations in Fig. 12 corresponds to the amplitude of the impulses in Fig. 11, i. e. to the rates of change of current in Fig. 10, and therefore to the changes of light intensity in Fig. 9. The oscillations of Fig. 12 can be transmitted by known means by wireless waves, increases and decreases of light intensity in the picture being represented by waves 180° phase displaced from one another. During periods of constant light intensity there will be no transmission.

In Fig. 12 it will be seen that each change of light intensity in Fig. 9 which over a plurality of mosaic elements is represented by a train of oscillations, the polarity of the oscillations being positive for increases of light intensity and negative for decreases.

The integrating screen of Fig. 1 has been described in connection with Figs. 5, 6 and 10, but similar effects can be obtained using, in the arrangements of Figs. 5 and 6, the device of Fig. 3 arranged as in the optical system of Fig. 4. In this case, however, the curve of light intensity will be considerably different as shown in Fig. 13, which corresponds to Fig. 9 so far as the object itself is concerned.

In Fig. 13 due to the black lines of the screen of Fig. 3, the light intensities will be zero at the black lines, and between the black lines will be at an intensity corresponding to some portion of the picture. If a picture such as Fig. 13 is scanned by an aperture of the type described in connection with Figs. 7 and 8, the width of the aperture being relatively equal (that is to say equal taking into consideration any optical magnification or reduction) to the width of a black line together with the width of the space between two black lines, the current of a photoelectric cell will be of the form shown in Fig. 14.

In Fig. 14 it will be noted that the picture takes the form of a modulated frequency, the frequency being the same as that of the impulses in Fig. 11, due to the fact that the scanning aperture and the speed of scanning decide the frequency. In Fig. 14 the oscillations are shown as having an amplitude equal to that in Fig. 13, but this would actually not be obtained in practice, for when the centre of the scanning aperture coincides with the centre of one of the black points of Fig. 13, the current of Fig. 14 will be not be exactly zero for the aperture is wider than the black band, and therefore the zero current line will be as shown by the dotted curve $m$ in Fig. 14. This modification results in some disturbance of the relative shade values of details in the received picture, and therefore is not so good as methods using the screen of Fig. 1.

The screen of Fig. 3 has been described as having the thickness of the black lines equal to the thickness of the transparent lines, but this is not essential, as the white lines may be wider than the black lines, or vice versa, and this of course will result in some modification of Figs. 13 and 14. Increasing the thickness of the black lines can only be accomplished by modifying the screen of Fig. 3, but increasing the thickness of the transparent lines can be accomplished in other ways. For instance, if in Fig. 4 the echelon device 7 is arranged to form an image not of the screen itself, but of some plane removed from the screen, then the white lines will appear in Fig. 13 as being much thicker. Increasing the thickness of the white lines in the ultimate will make the screen of Fig. 3 equivalent to the screen of Fig. 1, in which case of course the graphs 9, 10 and 11 will apply instead of 13 and 14.

The oscillation of Fig. 14 being of a wireless frequency may, after suitable amplification, be transmitted directly, received by normal wireless receivers, and used to operate a light control device of a television receiving instrument after suitable rectification.

Generally, the screen of Fig. 3 is in practice not so satisfactory as the screen of Fig. 1, because of optical difficulties and the possibility of slight inaccuracies in the optical arrangement and focussing producing erratic results, whereas the screen of Fig. 1 will not produce any serious difficulties. Even though the plates vary appreciably in thickness, for instance, if the device of Fig. 1 has plates with a tolerance of 10% in thickness, no serious disturbance of the curves shown in Figs. 9, 10 and 11 will be produced, nor will there by any tendency to the production of extraneous frequencies in Fig. 11. Furthermore, its use from an optical point of view is very simple.

Using the arrangement of Fig. 5 to obtain a photo-electric current as shown in Fig. 10, transmission can be accomplished in the same way as would be obtained with Fig. 13, by modulating an oscillation equal in frequency to that shown in Fig. 13 by the photo-electric current of Fig. 10, or alternatively, if modulation takes place in the photo-electric cell (e. g. using a cell such as described in the specification of patent application Serial No. 427,882), a variation of light intensity following the graph of Fig. 10 will modulate the oscillation in the circuit of the photo-electric cell. In this case the frequency of the oscillation to be modulated would be in phase relative to the oscillation shown in Fig. 13. No side frequency will be produced with such a modulation, for any tendency to change the amplitude of the modulation occurs at a frequency equal to that of the oscillation itself, so that the resultant modulated oscillation is truly amplitude modulated as shown in Fig. 13.

The current shown in Fig. 13 and that obtained in the last mentioned method using the screen of Fig. 1 may also be used to modulate a carrier oscillation, in which case there will be produced only one pair of side frequencies which are widely separated from the carrier frequency and from each other, and therefore by ordinary tuning methods the carrier frequency and one side frequency can be readily suppressed, leaving one side frequency for the purposes of accomplishing transmission. In this case reception may be accomplished with normal wireless receivers, which rectify the received oscillation, the rectified current being used to operate a light control device in the television receiving instrument.

When transmission is accomplished by means of wireless waves of the type shown in Figs. 11 and 12, it is necessary at the receiving instrument to have some device to insert correct constant periods for the purpose of reconstructing a replica of the photo-electric cell current shown in Fig. 10. Such a device is shown in Fig. 15.

In Fig. 15 a thermionic valve 26 has its anode 28 connected to the filament 29 of a second thermionic valve 27, and also to the grid 31 of a third thermionic valve 30. The filament 32 of valve 26 is connected through a battery 33 to the anode 34 of the valve 26. The middle point of the battery 33 is connected to the filament 35 of the valve 30. In some cases a condenser 36 (shown in dotted lines) may be shunted across the grid 31, and filament 35 of the valve 30, but its capacity must be carefully chosen for the purpose in view. The grid 37 of valve 26 is connected to the filament 32 through a circuit containing a secondary winding 38 of a transformer and means for applying grid biassing potential (such as a battery 39). The grid 40 of the valve 27 is similarly connected to the filament 29 through a secondary winding 41 of the transformer, and a means of grid biassing potential shown as the battery 42. Valves 26 and 27 have applied to their grids a negative potential of such a value that the anode currents of the two valves are zero. The anode circuit of the valve 30 is of a usual known type containing a source of electric potential and an output device shown respectively by the battery 43 and the impedance 44.

The received impulses of the form shown in Fig. 11 are applied to the primary winding 45 of the transformer. A positive impulse, such as the first impulse between $o$ and $a$ in Fig. 11 will cause a current to pass through only one of the two valves 26 and 27, thereby building up an electric charge on the grid 31 of the valve 30 in a manner shown by the graph of Fig. 16. When the first impulse ceases, the charge on the grid 31 cannot leak away through either of the valves 26 and 27, and therefore is maintained at a constant potential apart from the very small unavoidable insulation leakages between grid 31 and the filament 35 of the valve 30. When the second positive impulse is received, a further charge is added to that already present on the grid 31, building it up to a still higher potential as shown in Fig. 16, and similarly with the third positive impulse, so that the level of the anode current of valve 30 is at the value $a$ in Fig. 16. The next impulse after $a$ in Fig. 11 is negative, and therefore operates the other valve of the pair 26 and 27, causing a charge of the opposite polarity to be impressed on the grid 31, thereby reducing the level of the anode current of the valve 30, as shown in Fig. 16, and similarly the two other negative impulses between $a$ and $b$ in Fig. 11 will cause successive decreases in the level of the anode current of 30 down to the point $b$ in Fig. 16, at which point the anode current will remain constant for a period until the next three impulses up to $c$ in Fig. 11 are applied, which will cause an increase of the anode current of 30 up to the point c in Fig. 16, and again the anode current will remain constant for a period. It will be seen from this that the anode current shown in Fig. 16 is a replica of the photo-electric cell current shown in Fig. 10, with the exception that a small constant current is added to it, which is represented by the difference between the zero line and the dotted line n in Fig. 16, consequently the output from terminals 46 of the impedance 44 may be a perfect replica of the current of Fig. 10 by including a source of potential 47 in the output circuit from 44 of such a value as to balance out n in Fig. 16.

In the case of wireless waves of the type shown in Fig. 12 it is necessary, at the receiver, to rectify the oscillations before the holding device of Fig. 15 becomes operative. A convenient way of accomplishing this rectification is to have a local oscillation equal in frequency to the carrier oscillation of which Fig. 12 is a side frequency, and rectify together the oscillations of Fig. 12 with that local oscillation, thereby reproducing a replica of Fig. 11. An alternative method consists in using a receiver of the type described in the specification of patent application Serial No. 582,599 in which there is employed a local oscillation equal in frequency to the oscillation of Fig. 12, consequently the portion o to a of Fig. 12 would, say, decrease the strength of the local oscillation and the portion a to b would increase the local oscillation, thereby producing a replica of Fig. 11 after rectification.

The form of scanning aperture shown in Figs. 7 and 8, though to be preferred, is not the only type that may be used, for instance, the shading of the aperture may follow a law as shown by that portion of the solid line curve in Fig. 8 above the dotted line 26, i. e. half a cycle of a sinusoidal curve. In this case the predominating frequency produced during scanning of successive increases or decreases of light intensities will be equal to that produced by the aperture of Figs. 7 and 8 as previously described, but should an increase of light intensity be followed immediately by a decrease of light intensity or vice versa, there will be a tendency to produce a frequency having half the number of cycles per second, as that described in connection with Figs. 7 and 8. This is not very desirable though it would not seriously interfere with transmission by producing a very wide side band of frequencies. The scanning aperture need not be shaded but may have a particular shape, so that the effective area and therefore the light passing through it varies across the aperture in the direction of scanning to produce any of the effects previously described.

Fig. 17 shows diagrammatically the arrangement of one form of transmitter using this invention. The leads 19 and 20 from the photo cell of an arrangement similar to Fig. 5 or Fig. 6 are connected to an amplifier 48, which should preferably be of a type capable of amplifying transient electrical currents without distortion of the wave form, and without setting up trains of oscillations i. e. a resistance amplifier, preferably without condenser coupling between the thermionic valves. The amplifier 48 is connected to a modulator 49 in cases where it is required to modulate a carrier oscillation. The output of 49 will be one side frequency of the carrier oscillation, the carrier and the other side frequency being suppressed in 49 by known methods of tuning. The modulator 49 is connected to a power amplifier 50, the output of which is connected to the antenna system 51. In cases where transmission is to be accomplished as described in connection with Fig. 11 or Fig. 14, the amplifier 48 may be connected to the antenna system 51 directly or, alternatively, through the power amplifier 50, i. e. eliminating modulator 49. For instance, if the photo electric cell current as shown in Fig. 10 is amplified by 48 which is coupled directly to the antenna system 51, the ether waves transmitted will be substantially of the type shown in Fig. 11. Similarly, if the photo-electric current as shown in Fig. 14, or the other currents described in connection with Fig. 14 are applied direct to the aerial system of 51, the waves transmitted are substantially of the type shown in Fig. 14.

A diagrammatic arrangement of one form of wireless receiving apparatus at the receiving station is shown in Fig. 18, where the antenna system 52 is connected to a receiver 53, which should be preferably of the type described in the specification of patent application Serial No. 582,599. In the case where the received signals are substantially of the type shown in Fig. 11, the output of the receiver 53 is connected to a holding device 54 of the type shown in Fig. 15, the function of which is to insert the correct constant periods required to reproduce a replica of the current shown in Fig. 10. The output of 54 is connected by means of the leads 55 and 56 to the light control device of the television receiver.

I claim:

1. Television and the like apparatus having an optical system comprising a scanning aperture, a first and a second laminated optical element, these elements having their laminae disposed in substantially mutually perpendicular planes, the planes of the laminae of both said elements being substantially parallel to the optical axis of said system, the laminae of said first element having entrant and emergent edge surfaces and the laminae of said second element being lenticular, means for forming an image of an object to be transmitted upon said entrant edge surfaces, means for cooperating with said lenticular laminae in forming in the neighborhood of said aperture images of said emergent edge surfaces and means for producing relative motion between the last named images and said aperture.

2. The method of transmitting an image which comprises resolving said image into a multiplicity of elemental images each representative of the brightness of an elemental area of the first-named image and having substantially uniform brightness in at least one direction, producing relative motion in said direction between said elemental images and a photo-sensitive device thereby generating in said device an electric current wave representative of the brightness of said elemental images, and developing from said current wave a second current wave composed of impulses of the same wave length, of like substantially continuously curved wave form and of amplitude dependent upon the difference in brightness of one of said elemental images over the preceding elemental image.

3. The method of transmitting an image which comprises resolving said image into a multiplicity of elemental images each representative of the brightness of an elemental area of the first-named image and having substantially uniform brightness in at least one direction, producing relative motion in said direction between said elemental images and a photo-sensitive device, thereby generating in said device an electric current wave representative of the brightness of said elemental images, and developing from said current wave a second current wave consisting substantially wholly in pulses all of the same wave length and each being in the form of one complete cycle of a substantially sinusoidal wave, some of said pulses being in one phase and the remainder being of opposite phase.

4. The method of transmitting an image which comprises resolving said image into a multiplicity of elemental images each representative of the brightness of an elemental area of the first-named image and having substantially uniform brightness in at least one direction, producing relative motion in said direction between said elemental images and a photo-sensitive device, thereby generating in said device an electric current wave representative of the brightness of said elemental images, and developing from said current wave a second current wave consisting of pulses of periodically varying wavelength, of like substantially continuously curved wave form and of amplitude dependent upon the difference in brightness of one of said elemental images over the preceding elemental image.

5. The method of transmitting an image which comprises resolving said image into a multiplicity of elemental images each representative of the brightness of an elemental area of the first-named image and having substantially uniform brightness in at least one direction, producing relative motion in said direction between said elemental images and a photo-sensitive device, thereby generating in said device an electric current wave representative of the brightness of said elemental images, and developing from said current wave a second current wave consisting of pulses of periodically varying wavelength and each being in the form of one complete cycle of a substantially sinusoidal wave, some of said pulses being in one phase and the remainder being of opposite phase.

6. Television and like apparatus comprising an electrically photo-sensitive device, an apertured screen disposed in the light path extending from an object to be transmitted to said device, means for forming upon said screen from each elemental area of said object an elemental image having a brightness which is substantially uniform in one direction and dependent upon the average brightness of said elemental area and means for producing relative motion in said direction between said elemental images and said aperture, the light transmitting properties of said aperture being greater at the center than at the edges thereof and the width of said aperture being substantially equal to the width of said elemental image in said direction.

7. The method of transmitting an image which comprises resolving said image into a multiplicity of elemental images each representative of the brightness of an elemental area of the first named image and having substantially uniform brightness in at least one direction, producing relative motion between said elemental images and a photo-sensitive device thereby generating in said device an electric current wave representative of the brightness of said elemental images, and producing from said current wave a series of electrical pulses of like shape but differing amplitudes wherein an increase in relative brightness of one of said elemental images over the preceding elemental image is represented by a pulse of one sign and a decrease in said relative brightness is represented by a pulse of opposite sign.

8. The method of transmitting an image which comprises resolving said image into a multiplicity of elemental images each representative of the brightness of an elemental area of the first named image and having substantially uniform brightness in at least one direction, producing relative motion in the said direction between said elemental images and a photo-sensitive device thereby generating in said device an electric current wave representative of the brightness of said elemental images, and producing from said current wave a series of electrical pulses of the same wave length and shape but of differing amplitudes wherein an increase in relative brightness of one of said elemental images over the preceding elemental image is represented by a pulse of one phase and a decrease in said relative brightness is represented by a pulse of opposite phase.

GEORGE WILLIAM WALTON.